United States Patent Office 2,704,299
Patented Mar. 15, 1955

2,704,299

PREPARATION OF BIS-CHLOROMETHYL ETHER

Saul R. Buc, Easton, Pa., assignor to General Aniline & Film Corporation, New York, N. Y., a corporation of Delaware No Drawing. Application April 15, 1952,
Serial No. 282,457

10 Claims. (Cl. 260—614)

This invention relates to a method of preparing bis-chloromethyl ether.

In recent years, the art of chloromethylation of chemical compounds has been increasingly developed primarily because it has been found to provide a superior means for producing reactive chemical intermediates which may be readily converted into chemical products with widely diverse properties, such as dyestuffs and other substances. Accordingly, a great deal of effort has been expended in attempting to produce an effective chloromethylating reagent by a dependable, efficient process.

Bis-chloromethyl ether is an excellent chloromethylating reagent, and has been hitherto produced by a variety of methods, all of which are unsatisfactory in one or more important respects:

(1) It has been made from formalin and dry HCl:

$$2HCl + 2CH_2O \rightarrow ClCH_2OCH_2Cl + H_2O$$

(Tischtschenko, Ber. 20 (Referate) p. 702 (1887); Litterschied and Timme, Ann. 334, 1 (1904); Stephen, Short and Gladding, J. C. S. 117, 510 (1920).) This method gives a grossly impure material whose actual content of pure product has never been demonstrated.

(2) It has been made from paraformaldehyde and $PCl_3$:

$$6CH_2O + 2PCl_3 \rightarrow P_2O_3 + 3ClCH_2OCH_2Cl$$

(Descude, Bull. Acad. Roy. Belg. (1906) 206.) This method is operationally unsatisfactory and never goes to completion. Thus the final product contains starting materials and by-products which cannot be readily separated.

(3) It has been made from paraformaldehyde and $POCl_3$:

$$6CH_2O + 2POCl_3 \rightarrow P_2O_5 + 3ClCH_2OCH_2Cl$$

(Löbering and Fleischmann, Ber. 70B, 1682 (1937).) This method is subject to the same objections as the method above.

(4) It occurs as a minor product in the reaction of paraformaldehyde with chlorosulfonic acid. (Fuchs and Katscher, Ber. 60B, 2288 (1927).)

(5) It is claimed that it can be made by treating paraformaldehyde dissolved in concentrated sulfuric acid with dry HCl or with $NH_4Cl$. (Schneider, Z. Ang. Chem. 51, 274 (1938).) Neither of these methods has been found capable of reproduction.

(6) The best of the prior methods is to treat paraformaldehyde suspended in 70–80% sulfuric acid with $ClSO_3H$:

$$2CH_2O + 2ClSO_3H + H_2O \rightarrow ClCH_2OCH_2Cl + 2H_2SO_4$$

(Norris, J. I. E. C. 11, 827; Vorozhtov and Yuruigina, C. A. 25, 4522 (1931).) This method uses much larger amounts of reagents than the method of this invention. Also because of the very large final volume of sulfuric acid, much product is lost because of its solubility in this reagent.

An object of this invention is to provide an improved process for making bis-chloromethyl ether. Other objects and advantages will appear as the description proceeds.

These objects are attained by the instant invention which comprises reacting chlorosulfonic acid with formaldehyde in the presence of HCl. This process gives better and more reproducible yields and employs smaller amounts of reagents than the methods hitherto employed.

While other methods of carrying out the invention may be employed, the preferred method involves the gradual addition of the chlorosulfonic acid to a suspension of formaldehyde in HCl. The chlorosulfonic acid is added to the suspension as rapidly as the HCl formed will react. If the chlorosulfonic acid is added at too high a rate, gaseous HCl will be lost from the mixture, as evidenced by bubbling, detection of fumes of HCl, or the like. In general, the time required for addition of the required amount of chlorosulfonic acid will range from about 4 to 8 hours. The addition may be followed if desired by stirring the mixture for an additional period in order to assure completion of the reaction.

During the addition, the mixture is maintained at a low temperature by cooling. While the temperature may range from 0° C. up to room temperature, it is preferred to keep the temperature within the limits of about 0° to 10° C. Following the addition of the required amount of chlorosulfonic acid and during the subsequent period during which the mixture is stirred to assure completion of the reaction, the temperature may be allowed to rise to room temperature.

The molar quantities of the components are chosen such that the total available chlorine, obtained from the original HCl and from the chlorosulfonic acid by hydrolysis thereof, is in excess of the molar quantity of formaldehyde reacted upon. In general, it is preferred to maintain a 10 to 40% excess of available chlorine, or in other words from about 1.10 to 1.40 moles of chlorine per mole of formaldehyde. The proportion of HCl to chlorosulfonic acid is variable within limits, but should be so selected that the concentration of $H_2SO_4$ in the aqueous sulfuric acid layer remaining in the mixture upon completion of the reaction is from about 50 to 100% by weight, and preferably from about 80 to 100%. Best results are obtained when the final concentration of sulfuric acid is about 90%.

The proper determination of the relative amounts of HCl and chlorosulfonic acid to be employed in order to attain the desired high final sulfuric acid concentration is complicated by various factors, including the amount of water present in the initial HCl, the water produced by the reaction between HCl and formaldehyde, the water needed for the reaction between chlorosulfonic acid and formaldehyde, etc. However, the skilled chemist, knowing the final acid concentration desired, the desired amount of excess available chlorine, and the composition of the initial components, may readily determine the amounts of HCl and chlorosulfonic acid required to carry out the reaction. The following equations, based on reaction of one mole of formaldehyde, have been found to provide a substantially reliable expedient for determining the amounts of components to be employed:

$$a = \frac{2ym}{2x - xm + ym}$$

$$x + y = r$$

wherein $a$ is the mole fraction of $H_2SO_4$ in the aqueous sulfuric acid layer at the end of the reaction; $m$ is the mole fraction of HCl in the original aqueous HCl solution; $r$ is the total moles of available chlorine; $x$ is the moles of aqueous HCl solution to be employed; and $y$ is the moles of chlorosulfonic acid to be employed.

The components are employed in as high a concentration as permissive or expedient under the conditions of the process. Thus, paraformaldehyde is employed in preference to the commercial aqueous formalin (37%). Likewise, while higher concentrations of HCl may be employed when operating at elevated pressures, the preferred HCl is the usual concentrated (37–38%) aqueous HCl of commerce. Lower concentrations of HCl are not operationally desirable.

The following examples are illustrative of the invention and are not to be regarded as limitative.

*Example 1*

In a 1 liter 3-necked flask with stirrer and thermometer charge 168 ml. conc. HCl (38%), 240 g. paraformaldehyde.

Add with stirring from a dropping funnel over a period of about 4½ hours at 0–10° C., 452 ml. chlorosulfonic acid.

The quantities of reactants are chosen such that there is 0.25 mole of aqueous HCl and 0.85 mole of chlorosulfonic acid for each mole of formaldehyde. The total available chlorine therefore is 1.10 mole or 10% excess. When these quantities of reactants are used, the sulfuric acid produced when the reaction has gone to completion contains 10% water.

After completing addition of the chlorosulfonic acid, treat subsequently as follows:

Stir 3 hours, allowing temperature to rise. Separate layers. Wash upper layer by addition of excess ice, decant from ice, separate. Wash again with ice water. Add excess ice to product, add 40% NaOH with vigorous stirring until the aqueous phase is strongly alkaline. Separate product, dry rapidly over $K_2CO_3$, then over KOH, keeping cold during drying. Decant from KOH and distill.

The bis-chloromethyl ether produced boils at 100–103° C.

Yield 356 g.=77.5%.

*Example 2*

Charge:

96 ml. conc. (38%) HCl
120 g. paraformaldehyde

Drop in over a period of about five hours at 0–10° C., 295 ml. chlorosulfonic acid.

These amounts are chosen such that the total available chlorine is 1.375 moles per mole of formaldehyde (37.5% excess) and the sulfuric acid at the end of the reaction contains 5% water. The subsequent treatment of the reaction mixture is the same as in Example 1 and the yield is 170 g. or 74%.

*Example 3*

Charge:

132 ml. conc. HCl
120 g. paraformaldehyde

Drop in as in previous examples, over a period of about 7 hours, 266 ml. chlorosulfonic acid.

These amounts are chosen such that the total available chlorine is 1.40 moles per mole $CH_2O$ and the final acid conc. is 85%.

Work up as before.
Yield 169 g.=74%.

*Example 4*

Charge:

105 ml. conc. HCl
120 g. paraformaldehyde

Drop in as in previous examples, over a period of about 8 hours, 208 ml. chlorosulfonic acid.

These amounts are chosen such that the total available chlorine is 1.10 moles/mole $CH_2O$ and the final acid concentration is 85%.

Work up as before.
The yield is 174 g.=76%.

*Example 5*

Charge:

125 ml. conc. HCl
120 g. paraformaldehyde

Drop in as before, over a period of about 7 hours, 193 ml. chlorosulfonic acid.

These amounts are chosen such that the total available chlorine is 1.10 moles/mole $CH_2O$ and the final acid concentration is 80%.

Work up as before.
Yield 158 g.=69%.

*Example 6*

Charge:

158 ml. conc. HCl
120 g. paraformaldehyde

Drop in as before, over a period of about 6 hours, 168 ml. chlorosulfonic acid.

These amounts are chosen such that the total available chlorine is 1.10 moles/mole $CH_2O$ and the final acid conc. is 70%.

Work up as before.
Yield 99 g.=43%.

*Example 7*

Charge:

64 ml. conc. HCl
40 g. paraformaldehyde

Drop in at 0°–10° C., 45 ml. $ClSO_3H$.
Add 40 g. additional paraformaldehyde.
Drop in at 0°–10° C., 15 ml. $ClSO_3H$.
Add 40 g. additional paraformaldehyde.
Drop in at 0°–10° C., 180 ml. $ClSO_3H$.

Total time of addition is 5¼ hours. These additions are staggered as described to permit stirring during the early stages when the volume of liquid is low. These quantities are chosen such that the total available chlorine is 1.10 equivalents and the final acid conc. is 95%.

Work up as before.
Yield—168 g.=73%.

*Example 8*

Charge:

44 ml. conc. HCl
30 g. paraformaldehyde

Add in increments, as in previous example, at 0°–10° C., 35 ml. $ClSO_3H$, 30 g. paraformaldehyde, 15 ml. $ClSO_3H$, 60 g. paraformaldehyde, 206 ml. $ClSO_3H$.

Total time of addition is 5 hours. Work up as before. This product is essentially pure without distillation after washing and drying ($K_2CO_3$, then KOH), the final acid concentration being 100%.

Yield before distillation=163 g.=71%.
Yield after distillation=160 g.=70%.

*Example 9*

Charge:

226 ml. conc. HCl
120 g. paraformaldehyde

Drop in as before, in 1 hour, 114 ml. chlorosulfonic acid.

These amounts are chosen such that total available chlorine is 1.10 moles/mole $CH_2O$ and the final acid concentration will be 50%. The reaction obviously does not go to completion. Large amounts of unreacted paraformaldehyde are visible at the end and do not disappear after three days' stirring. There is a small amount of product visible, but in view of the obvious incompletion of the reaction and the progressively poorer yields with diminishing final sulfuric acid concentration, this reaction was not worked up.

In the above examples, the yield stated is determined after a final distillation, unless otherwise indicated.

Various modifications and variations of this invention will be obvious to a person skilled in the art and such variations and modifications are to be regarded as within the purview of this application and the spirit and scope of the appended claims.

I claim:

1. A process for preparing bis-chloromethyl ether comprising reacting formaldehyde, chlorosulfonic acid and HCl by mixing them at a temperature of from about 0° C. to room temperature in such proportions that the amounts of chlorosulfonic acid and HCl are sufficient to supply from about 1.1 to 1.4 moles of available chlorine per mole of formaldehyde, and a final sulfuric acid concentration of about 50 to 100 per cent.

2. A process for preparing bis-chloromethyl ether comprising reacting formaldehyde, chlorosulfonic acid and HCl by mixing them at a temperature of from about 0° C. to room temperature in such proportions that the amounts of chlorosulfonic acid and HCl are sufficient to supply from about 1.1 to 1.4 moles of available chlorine per mole of formaldehyde, and a final sulfuric acid concentration of about 80 to 100 per cent.

3. A process for preparing bis-chloromethyl ether comprising gradual addition of chlorosulfonic acid to a suspension of formaldehyde in HCl, at a temperature of from about 0° C. to room temperature, the chlorosulfonic acid and HCl being employed in amounts sufficient to supply from about 1.1 to 1.4 moles of available chlorine per mole of formaldehyde, and a final sulfuric acid concentration of about 50 to 100 per cent.

4. A process for preparing bis-chloromethyl ether comprising gradual addition of chlorosulfonic acid to a suspension of formaldehyde in HCl, at a temperature of from about 0° C. to room temperature, the chlorosulfonic acid and HCl being employed in amounts sufficient to supply from about 1.1 to 1.4 moles of available chlorine per mole of formaldehyde, and a final sulfuric acid concentration of about 80 to 100 per cent.

5. A process for preparing bis-chloromethyl ether comprising reacting paraformaldehyde, chlorosulfonic acid and HCl by mixing them at a temperature of about 0° C. to room temperature in such proportions that the amounts of chlorosulfonic acid and HCl are sufficient to supply from about 1.1 to 1.4 moles of available chlorine per mole of formaldehyde, and a final sulfuric acid concentration of about 50 to 100 per cent.

6. A process for preparing bis-chloromethyl ether comprising gradual addition of chlorosulfonic acid to a suspension of paraformaldehyde in concentrated HCl at a temperature of about 0° to 10° C., the chlorosulfonic acid and HCl being employed in amounts sufficient to supply from about 1.1 to 1.4 moles of available chlorine per mole of formaldehyde.

7. A process for preparing bis-chloromethyl ether comprising gradual addition of chlorosulfonic acid to a suspension of paraformaldehyde in concentrated HCl at a temperature of about 0° to 10° C., the chlorosulfonic acid and HCl being employed in amounts sufficient to supply from about 1.1 to 1.4 moles of available chlorine per mole of formaldehyde, and a final sulfuric acid concentration of about 50 to 100%.

8. A process for preparing bis-chloromethyl ether comprising gradual addition of chlorosulfonic acid to a suspension of paraformaldehyde in concentrated HCl at a temperature of about 0° to 10° C., the chlorosulfonic acid and HCl being employed in amounts sufficient to supply from about 1.1 to 1.4 moles of available chlorine per mole of formaldehyde, and a final sulfuric acid concentration of about 80 to 100%.

9. A process for preparing bis-chloromethyl ether comprising gradual addition of chlorosulfonic acid to a suspension of paraformaldehyde in concentrated HCl at a temperature of about 0° to 10° C., the chlorosulfonic acid and HCl being employed in amounts sufficient to supply from about 1.1 to 1.4 moles of available chlorine per mole of formaldehyde, and a final sulfuric acid concentration of about 90%.

10. A process for preparing bis-chloromethyl ether comprising gradual addition of chlorosulfonic acid to a suspension of paraformaldehyde in concentrated HCl at a temperature of about 0° to 10° C., the molar proportion of aqueous HCl, chlorosulfonic acid and formaldehyde being, respectively, 0.25:0.85:1.

References Cited in the file of this patent

Norris: Industrial and Eng. Chem., vol. 11 (1919), pp. 827–8.